Aug. 11, 1964   G. A. EDWARDS   3,143,896
BALL NUT RETURN GUIDE
Filed March 20, 1962

INVENTOR.
George A. Edwards
BY
Bryce Beecher
ATTORNEY

United States Patent Office 3,143,896
Patented Aug. 11, 1964

3,143,896
BALL NUT RETURN GUIDE
George A. Edwards, Saginaw, Mich., assignor to General Motors Corporation, Detroit, Mich., a corporation of Delaware
Filed Mar. 20, 1962, Ser. No. 181,066
2 Claims. (Cl. 74—459)

This invention relates to an improvement in ball nut and screw devices.

Such devices are widely used in industry for translating lineal into rotary motion or vice versa. Thus, they are employed as actuators in various applications including machine tools, aircraft controls, etc. Another major field of use is in the steering of automotive vehicles.

These devices are characterized in that the helical groove of the screw and the internal helical groove of the nut are utilized as a race for a train of balls providing the connection between the two parts. Another essential component of the assembly is a return or transfer tube secured to the nut and allowing for continuous recirculation of the balls. Conventionally, this tube has been constituted of a pair of stampings secured in registry to the nut through a separate saddle or strap. In an effort to reduce assembly time, it has been proposed heretofore that flanges be formed integral with each of the two stampings so as to dispense with the saddle. While such a design is operable, there is little actual saving, especially in volume production, since any gain in assembly time is offset by an increased use of metal.

As suggested, a principal object of the invention is to work an advantage in both assembly and material costs. Additional objects will be apparent from the accompanying drawings illustrating a preferred embodiment of the invention and wherein.

Figure 1:
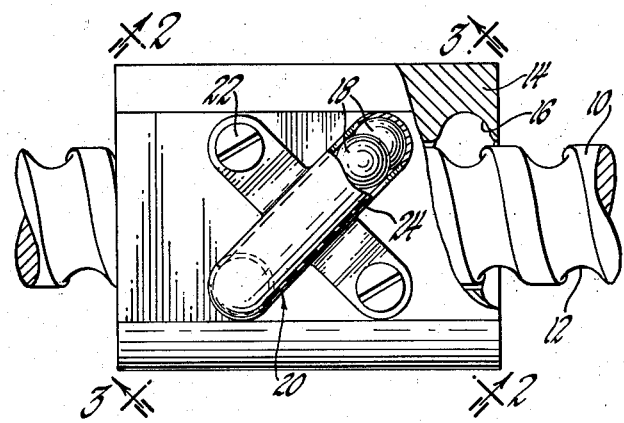
FIGURE 1 shows in elevation a ball nut and screw assembly conforming to the invention, the screw component being shown broken away.
Figure 2:
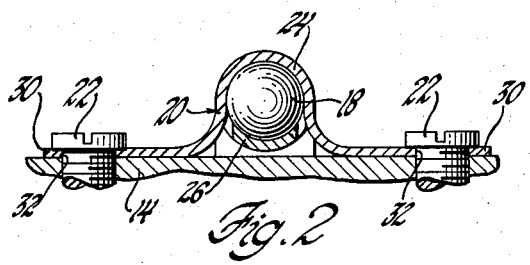
FIGURE 2 is an enlarged fragmentary section taken on the line 2—2 in FIGURE 1.

In the drawings, the numeral 10 denotes a screw having a helical groove 12. Carried on the screw is a ball nut 124 having an internal helical groove 16 formed complementarily to the screw groove. Balls 18 fill the race provided by the registering helical grooves and provide the connection between the screw and nut.

Figure 3:
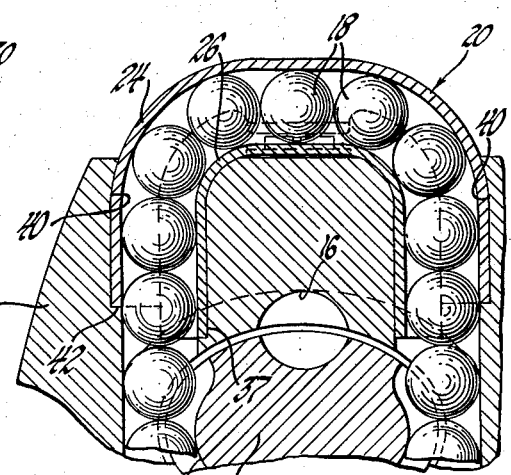
FIGURE 3 is an enlarged fragmentary section taken on the line 3—3 in FIGURE 1.
Figure 4:
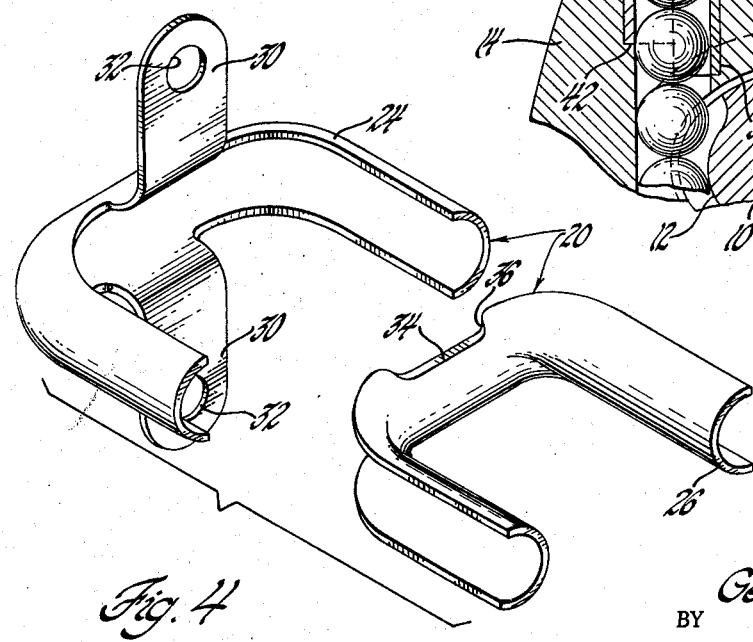
FIGURE 4 is an isometric exploded view showing the components of the transfer tube incorporated in the assembly.

In operation of the assembly, the balls 18 continually cycle through the return tube 20 secured to the body of the nut by screws 22. As best illustrated by FIGURE 4, this tube is made up of two parts 24 and 26 which when brought into registry yield an arcuate conduit (FIGURE 3) allowing for smooth, unobstructed transfer of the balls into and out of the race.

Return tube part 24 includes integral flanges 30 each of which is apertured (32) for the accommodation of one of the screws 22. Part 26 as viewed in cross section is formed to the same radius as part 24 and has a locating slot 34 providing shoulders 36, each pair of which embraces the base of the corresponding flange 30 to interlock the return tube parts 24 and 26 to prevent relative movement therebetween in directions parallel and transverse to the diagonally extending portion of the return tube 20.

From FIGURE 3 it is to be observed that the legs of the part 26 extend to a point below the legs of the part 24. The purpose of this is to provide the deflector fingers denoted by the numeral 37 in such figure. Each of these fingers depends well within the helical race and acts to pick up and guide the balls into the tube when the balls are travelling in the direction of the finger.

The undersurface of the element 26 rests in part upon the body of the nut between the two bores 40 receiving the depending legs of the transfer device. Shoulders 42 yielded by a counterboring operation seat the part 24.

While it will be apparent that the preferred embodiment herein illustrated is well calculated to fulfill the objects above stated, it will be appreciated that the invention is susceptible to modification, variation and change without departing from the proper scope or meaning of the subjoined claims.

What is claimed is:

1. An assembly comprising a screw carrying a nut interconnected to the screw through a train of balls utilizing the helical groove of the screw and the internal helical groove of the nut as a race, said race being made endless by a return tube extending diagonally across the body of the nut and having legs accommodated by spaced bores in the nut and opening to said race, said tube being constituted of inner and outer mating elements, the inner element forming an inner portion of the tube, the outer element forming an outer portion of the tube, the outer element being flanged for the accommodation of fastening means, fastening means for securing the tube to the nut, the inner element being retained against radial outward displacemnt solely by said outer element and extending further into said bores thereby to provide deflecting fingers facilitating movement of the balls into and out of said race and the inner and outer mating elements having interlock means operatively engaged to interlock the inner and outer mating elements to prevent relative movement therebetween in directions parallel and transverse to the diagonally extending portion of the return tube.

2. An assembly conforming to claim 1 where said interlock means comprises slots on said inner element having shoulders embracing said flanges on said outer element.

References Cited in the file of this patent
UNITED STATES PATENTS
2,780,943    Stump _____ Feb. 12, 1957
FOREIGN PATENTS
627,365    Great Britain _____ Aug. 8, 1949